(12) United States Patent
Inagaki et al.

(10) Patent No.: US 8,274,590 B2
(45) Date of Patent: *Sep. 25, 2012

(54) SOLID-STATE IMAGING DEVICE DRIVING METHOD

(75) Inventors: Makoto Inagaki, Nagaokakyo (JP); Yoshiyuki Matsunaga, Kyoto (JP)

(73) Assignee: Panasonic Corporation, Osaka (JP)

( * ) Notice: Subject to any disclaimer, the term of this patent is extended or adjusted under 35 U.S.C. 154(b) by 386 days.

This patent is subject to a terminal disclaimer.

(21) Appl. No.: 12/536,829

(22) Filed: Aug. 6, 2009

(65) Prior Publication Data

US 2009/0295961 A1    Dec. 3, 2009

Related U.S. Application Data

(62) Division of application No. 12/071,090, filed on Feb. 15, 2008, now Pat. No. 7,714,920, which is a division of application No. 10/532,992, filed as application No. PCT/JP2004/002282 on Feb. 26, 2004, now Pat. No. 7,352,399.

(30) Foreign Application Priority Data

Feb. 28, 2003    (JP) ................................. 2003-054589

(51) Int. Cl.
    *H04N 3/14* (2006.01)
(52) U.S. Cl. .................... 348/302; 348/301; 348/308
(58) Field of Classification Search ................ 348/300
    See application file for complete search history.

(56) References Cited

U.S. PATENT DOCUMENTS

| | | | |
|---|---|---|---|
| 5,969,758 A | 10/1999 | Sauer et al. | |
| 6,037,577 A * | 3/2000 | Tanaka et al. | 250/208.1 |
| 6,061,093 A | 5/2000 | Yonemoto | |
| 6,115,066 A * | 9/2000 | Gowda et al. | 348/308 |
| 6,344,877 B1 * | 2/2002 | Gowda et al. | 348/245 |
| 6,366,321 B1 | 4/2002 | Yonemoto | |
| 6,650,369 B2 * | 11/2003 | Koizumi et al. | 348/301 |

(Continued)

FOREIGN PATENT DOCUMENTS

EP    0 865 197 A2    9/1998

(Continued)

OTHER PUBLICATIONS

Mabuchi Keiji et al. (2004 IEEE International Solid-State Circuits conference). "CMOS Image Sensor Using a Floating Diffusion Driving Buried Photodiode".*

(Continued)

*Primary Examiner* — Jason Chan
*Assistant Examiner* — Abdelaaziz Tissire
(74) *Attorney, Agent, or Firm* — McDermott Will & Emery LLP (57) ABSTRACT

Photosensitive cells each includes a photodiode (1), a transfer gate (2), a floating diffusion layer portion (3), an amplifying transistor (4), and a reset transistor (5). Drains of the amplifying transistors (4) of the photosensitive cells are connected to a power supply line (10), and a pulsed power supply voltage (VddC) is applied to the power supply line (10). Here, a low-level potential (VddC_L) of the power supply voltage has a predetermined potential higher than zero potential. Specifically, by making the low-level potential (VddC_L) higher than channel potentials obtained when a low level is applied to the reset transistors (5), or channel potentials obtained when a low level is applied to the transfer gates (2), or channel potentials of the photodiodes (1), a reproduced image with low noise is read.

13 Claims, 6 Drawing Sheets

U.S. PATENT DOCUMENTS

| | | | |
|---|---|---|---|
| 6,791,613 B2 | 9/2004 | Shinohara et al. | |
| 7,030,922 B2 | 4/2006 | Sakuragi | |
| 7,110,030 B1 | 9/2006 | Kochi et al. | |
| 7,116,365 B1 * | 10/2006 | Ueno et al. | 348/308 |
| 7,277,130 B2 | 10/2007 | Korthout et al. | |
| 7,283,168 B2 * | 10/2007 | Watanabe | 348/308 |
| 7,317,483 B2 | 1/2008 | Tanimoto | |
| 7,375,753 B2 * | 5/2008 | Mabuchi | 348/308 |
| 7,714,920 B2 * | 5/2010 | Inagaki et al. | 348/301 |
| 2003/0137594 A1 | 7/2003 | Koizumi et al. | |
| 2004/0027471 A1 | 2/2004 | Koseki et al. | |
| 2004/0251396 A1 * | 12/2004 | Koyama | 250/208.1 |
| 2005/0083408 A1 * | 4/2005 | Mabuchi | 348/207.99 |
| 2005/0128326 A1 | 6/2005 | Korthout et al. | |
| 2006/0001751 A1 | 1/2006 | Abe et al. | |

FOREIGN PATENT DOCUMENTS

| | | | |
|---|---|---|---|
| EP | 908957 A2 | 4/1999 | |
| GB | 2 347 212 A | 8/2000 | |
| JP | 9-247537 | 9/1997 | |
| JP | 10-93066 | 4/1998 | |
| JP | 11-112018 | 4/1999 | |
| JP | 2001-45375 | 2/2001 | |
| JP | 2002-511215 | 4/2002 | |
| JP | 2002-237584 | 8/2002 | |
| JP | 2003-230055 | 8/2003 | |
| WO | WO 98/56170 | 12/1998 | |
| WO | WO03/069897 | * | 8/2003 |
| WO | WO 03069897 | * | 8/2003 |

OTHER PUBLICATIONS

Mabuchi Keiji et al. (2004 IEEE Journal of Solid-State Circuits vol. 39. No. 12) "CMOS image sensors comprised of floating diffusion driving pixels with buried photodiode".*

United States Notice of Allowance issued in U.S. Appl. No. 12/071,090, mailed Feb. 23, 2010.

United States Office Action, issued in U.S. Appl. No. 12/536,814, dated Sep. 7, 2011.

* cited by examiner

SOLID-STATE IMAGING DEVICE DRIVING METHOD

RELATED APPLICATIONS

This application is a Divisional of U.S. application Ser. No. 12/071,090, filed on Feb. 15, 2008, which is now U.S. Pat. No. 7,714,920, which is a Divisional of U.S. application Ser. No. 10/532,992, filed Apr. 28, 2005, now U.S. Pat. No. 7,352,399, which is a U.S. National Phase of International Application No. PCT/JP2004/002282, filed Feb. 26, 2004, claiming priority of Japanese Application No. 2003-054589, filed Feb. 28, 2003, the entire contents of each of which are hereby incorporated by reference.

TECHNICAL FIELD

The present invention relates to a method of driving a MOS-type solid-state imaging device for use in various apparatuses such as home video cameras, digital still cameras, and mobile phone cameras.

BACKGROUND ART

Figure 5:
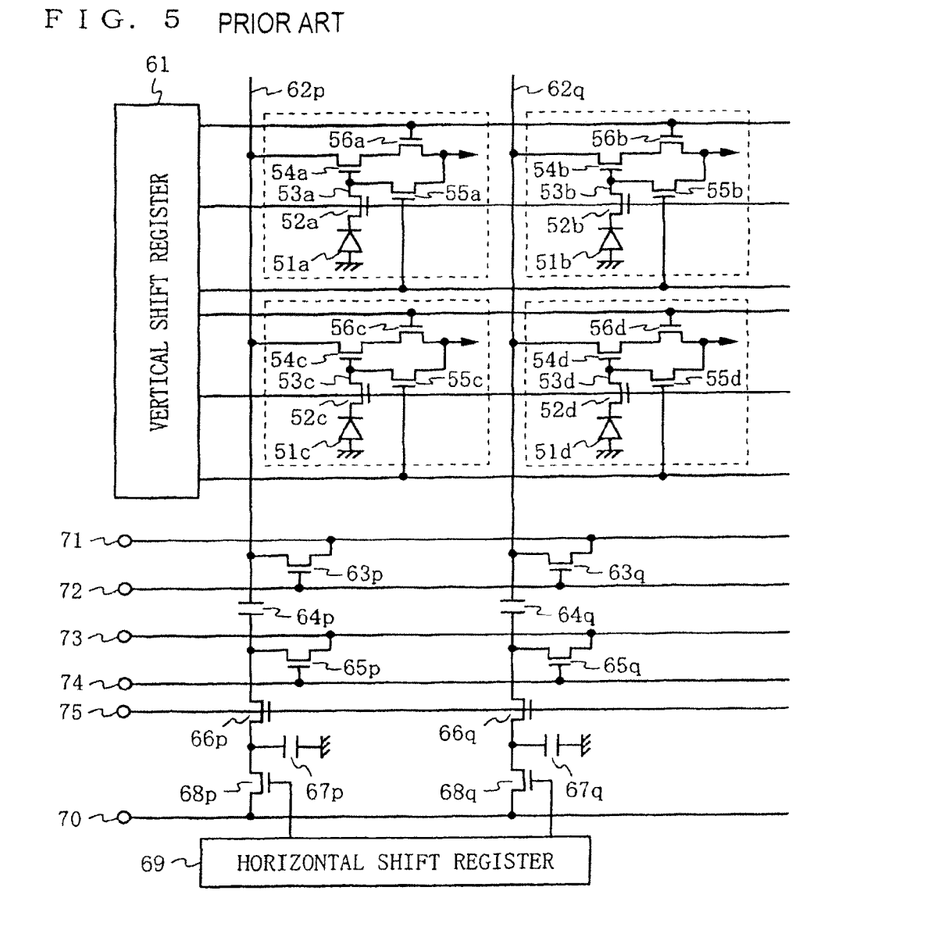
FIG. 5 is a circuit diagram of a conventional sensor.
Figure 6:
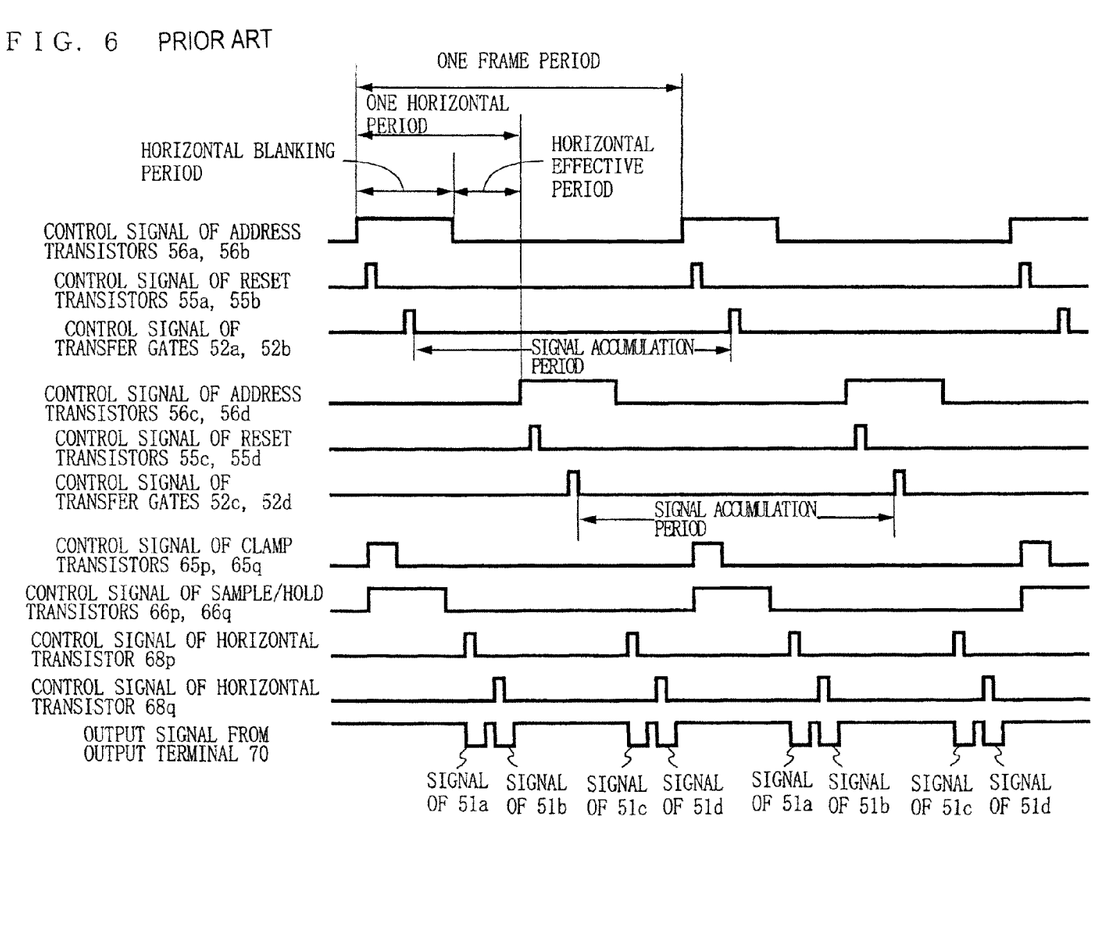
FIG. 6 is a timing chart showing a method of driving the conventional sensor.

With reference to FIGS. 5 and 6, a conventional sensor and a driving method thereof will be described. FIG. 5 is a circuit diagram of a conventional sensor. The sensor shown in FIG. 5 has photosensitive cells (the portions surrounded by dotted-lines) arranged in a 2×2 matrix form. Each photosensitive cell includes a photodiode 51, a transfer gate 52, a floating diffusion layer portion 53, an amplifying transistor 54, a reset transistor 55, and an address transistor 56, and corresponds to one of the pixels composing an image. Note that although the following description will assume, for simplicity, that the photosensitive cells are arranged in a 2×2 matrix form, in practice, several tens to several thousands of photosensitive cells are arranged in each of the row and column directions.

A method of driving the sensor shown in FIG. 5 is as follows. To extract signals from photosensitive cells in the first row, first, address transistors 56a and 56b included in the photosensitive cells in the first row are controlled to be in an ON state by a vertical shift register 61. Then, reset transistors 55a and 55b are similarly controlled to be in an ON state by the vertical shift register 61. This resets floating diffusion layer portions 53a and 53b. At this stage, an amplifying transistor 54a and a load transistor 63p form a source follower circuit, and an output from the source follower circuit appears on a vertical signal line 62p. Similarly, an amplifying transistor 54b and a load transistor 63q form a source follower circuit, and an output from the source follower circuit appears on a vertical signal line 62q as well. Voltages appearing on the vertical signal lines 62p and 62q at this stage are noise voltages which are unrelated to signal charges accumulated in photodiodes 51a and 51b. Subsequently, transfer gates 52a and 52b are controlled to be in an ON state by the vertical shift register 61. By this, the signal charges accumulated in the photodiodes 51a and 51b are transferred to the floating diffusion layer portions 53a and 53b, and signal voltages corresponding to the signal charges accumulated in the photodiodes 51a and 51b appear on the vertical signal lines 62p and 62q.

Clamp capacitors 64p and 64q, clamp transistors 65p and 65q, sample/hold transistors 66p and 66q, and sample/hold capacitors 67p and 67q form a noise suppression circuit. The noise suppression circuit determines the difference between a pixel output obtained when there are signal charges in the floating diffusion layer portions 53 (i.e., a signal output) and a pixel output obtained when there is no signal charge (i.e., a noise output). In the sensor shown in FIG. 5, mainly, noise caused by variations in the threshold voltages of the amplifying transistors 54 and kTC noise which is the thermal noise of the reset transistors 55 are generated. When noise outputs are appearing on the vertical signal lines 62p and 62q, the clamp transistors 65p and 65q and the sample/hold transistors 66p and 66q are controlled to be in an ON state through control terminals 74 and 75, and a noise-free clamp voltage is applied to the sample/hold capacitors 67p and 67q from a clamp voltage supply terminal 73. After a predetermined time has elapsed, the clamp transistors 65p and 65q are controlled to be in an OFF state through the control terminal 74.

Subsequently, a voltage equal to the sum of a noise-free signal voltage and a noise voltage appears on each of the vertical signal lines 62p and 62q. The vertical signal lines 62p and 62q each change from the noise voltage to the sum of the signal voltage and the noise voltage; the amount of the change is equal to the noise-free signal voltage. Therefore, the voltage of each of the clamp capacitors 64p and 64q on the sample/hold side also changes by an amount equal to the noise-free signal voltage. In practice, the voltage across each of the sample/hold capacitors 67p and 67q changes from the noise-free clamp voltage by an amount obtained by dividing the amount of signal voltage change on the corresponding vertical signal line 62p or 62q by a corresponding clamp capacitor and a corresponding sample/hold capacitor. Therefore, the voltage across each of the sample/hold capacitors 67p and 67q is the noise-free clamp voltage and the divided signal voltage, and the noise portion is removed. After the sample/hold transistors 66p and 66q are controlled to be in an OFF state, horizontal transistors 68p and 68q are sequentially and selectively controlled to be in an ON state by a horizontal shift register 69. By this, signals corresponding to the signal charges accumulated in the photodiodes 51a and 51b are sequentially outputted from an output terminal 70.

Next, to extract signals from photosensitive cells in the second row, the same operations as for the first row are performed on the photosensitive cells in the second row. By this, signals corresponding to signal charges accumulated in photodiodes 51c and 51d are sequentially outputted from the output terminal 70.

A timing chart showing the above-described operations is as shown in FIG. 6. In FIG. 6, the period during which signals accumulated in photodiodes 51 for one row are finally outputted from the output terminal 70 is called a horizontal effective period, and the period during which the signals are outputted from the photodiodes 51 to the vertical signal lines 62 and the noise of the outputted signals is suppressed is called a horizontal blanking period. The horizontal blanking period and the horizontal effective period are together called one horizontal period. The one horizontal period is the time actually required to read signals for one row. The time required to read signals from the entire sensor is called one frame period. As shown in FIG. 6, the amount of a signal charge accumulated in the photodiode 51 is determined by the time interval of a transfer pulse to be applied to the transfer gate 52. The time interval of the transfer pulse is constant during one frame period. Therefore, the photodiodes 51 have uniform sensitivity.

In the sensor shown in FIG. 5, each photosensitive cell is composed of four transistors (a transfer gate 52, an amplifying transistor 54, a reset transistor 55, and an address transistor 56). On the other hand, in recent years, for reduction in size of sensors, there has developed a sensor having photosensitive cells each composed of three transistors. This newly developed sensor has a configuration in which address transistors 56 are removed from the sensor shown in FIG. 5 and the power supply is shared between the photosensitive cells. In order to read signals from this sensor, it is necessary to supply a pulsed power supply voltage to each photosensitive cell.

A method of driving the sensor shown in FIG. 5 is described in Japanese Laid-Open Patent Publication No. 9-247537, for example. In addition, Japanese Laid-Open Patent Publication No. 2001-45375 describes a driving method by which signals from photodiodes for one row are averagely outputted in one horizontal period.

However, in the sensor in which each photosensitive cell is composed of three transistors, because the power supply is pulse-driven, problems such as those described below may arise. First, since the power supply is connected to all the photosensitive cells and not only a selected photosensitive cell but the entire sensor is driven, adverse effects are exerted on the operation of the entire sensor. Secondly, although the power supply voltage at a high level does not exert adverse effects on the operation of the sensor, the power supply voltage at a low level exerts adverse effects on the operation of a non-selected photosensitive cell. Thirdly, pulse-driving of the power supply per se exerts various adverse effects on the entire sensor.

In particular, in terms of the aforementioned second problem, if the low-level potential of the power supply becomes too low, this low-level potential may become equal to or lower than the low-level potential of the reset transistors of non-selected photosensitive cells and reach even to the gate regions of amplifying transistors. Here, a large number of amplifying transistors simultaneously go into operation and drive the entire sensor. Accordingly, a great noise is superimposed during a horizontal blanking period, and thereby signal processing becomes difficult.

If the low-level potential of the power supply becomes equal to or lower than the low-level potential of the transfer gates of non-selected photosensitive cells, charges are injected into photodiodes, causing variations in the amount of charge injected into the photosensitive cells. Accordingly, variations occur in signal charges to be read from the photodiodes and thereby a great noise appears in a reproduced image.

Therefore, an object of the present invention is to provide a method of driving a solid-state imaging device, by which a reproduced image with low noise is read from a sensor having photosensitive cells each composed of three transistors.

DISCLOSURE OF THE INVENTION

To achieve the above objects, the present invention has the following aspects.

A first aspect of the present invention is directed to a method of driving a solid-state imaging device comprising: a photosensitive region having photosensitive cells arranged two-dimensionally in row and column directions on a semiconductor substrate, each photosensitive cell including a photodiode for accumulating a signal charge obtained by converting incoming light into electricity; a transfer transistor for transferring the signal charge accumulated in the photodiode; a floating diffusion layer portion for temporarily accumulating the transferred signal charge; an amplifying transistor for amplifying the signal charge accumulated in the floating diffusion layer portion; and a reset transistor for resetting the signal charge accumulated in the floating diffusion layer portion; a power supply line commonly connected to drains of the amplifying transistors; a vertical driver circuit for individually driving transfer transistors arranged in a same row and reset transistors arranged in the same row; a plurality of vertical signal lines each having commonly connected thereto corresponding amplifying transistors arranged in a same column; a plurality of load transistors connected to the vertical signal lines, respectively; a noise suppression circuit for suppressing noise of signals outputted to the vertical signal lines; a plurality of horizontal transistors which are arranged in the row direction, and to which outputs from the noise suppression circuit are inputted; and a horizontal driver circuit for allowing the horizontal transistors to sequentially and selectively operate, and thereby sequentially outputting the outputs from the noise suppression circuit, the method comprising the steps of: pulse-driving the power supply line on a per horizontal period basis; sequentially selecting different rows on a per horizontal period basis using the horizontal driver circuit, and allowing corresponding reset transistors and corresponding transfer transistors included in corresponding photosensitive cells arranged in a selected row to successively operate while the power supply line is driven, and thereafter allowing the corresponding reset transistors to operate while the power supply line is not driven; and sequentially outputting outputs from the noise suppression circuit on a per horizontal period basis using the horizontal driver circuit, wherein a low-level potential of the power supply line has a predetermined potential higher than zero potential.

According to the method of driving the solid-state imaging device, by making the low-level potential of the power supply line higher than zero potential, it is possible to prevent the entire sensor from being driven and to stabilize the potential of each pixel. Accordingly, a reproduced image with low noise can be read.

In the method of driving the solid-state imaging device, the predetermined potential may be higher than channel potentials obtained when a low level is applied to the reset transistors. By doing so, the amplifying transistors are prevented from operating in the vicinity of their respective gate regions, and thus it is possible to prevent a situation where a large number of amplifying transistors simultaneously go into operation and as a result the entire sensor is driven. Accordingly, it is possible to solve a problem that a great noise is superimposed during a horizontal blanking period, and thereby signal processing becomes difficult.

Alternatively, the predetermined potential may be higher than channel potentials obtained when a low level is applied to the transfer transistors. By doing so, it is possible to prevent a situation where because of the charges injected into the photodiodes, variations in the amount of charge to be injected occur in the photosensitive cells. Accordingly, a beautifully reproduced image with low noise can be read without causing a great noise to appear in the reproduced image.

Alternatively, the predetermined potential may be higher than channel potentials of the photodiodes. By doing so, it is possible to prevent the entire sensor from being driven and to stabilize the potential of each pixel. Accordingly, a reproduced image with low noise can be read.

In the method of driving the solid-state imaging device, the photosensitive region may be formed on a p-type substrate. By doing so, a reproduced image with low noise can be read from a solid-state imaging device having a photosensitive region formed on a p-type substrate.

Alternatively, the photosensitive region may be formed in a p-type well on an n-type substrate. By doing so, a reproduced image with low noise can be read from a solid-state imaging device having a photosensitive region formed in a p-type well on an n-type substrate.

BEST MODE FOR CARRYING OUT THE INVENTION

Figure 1:
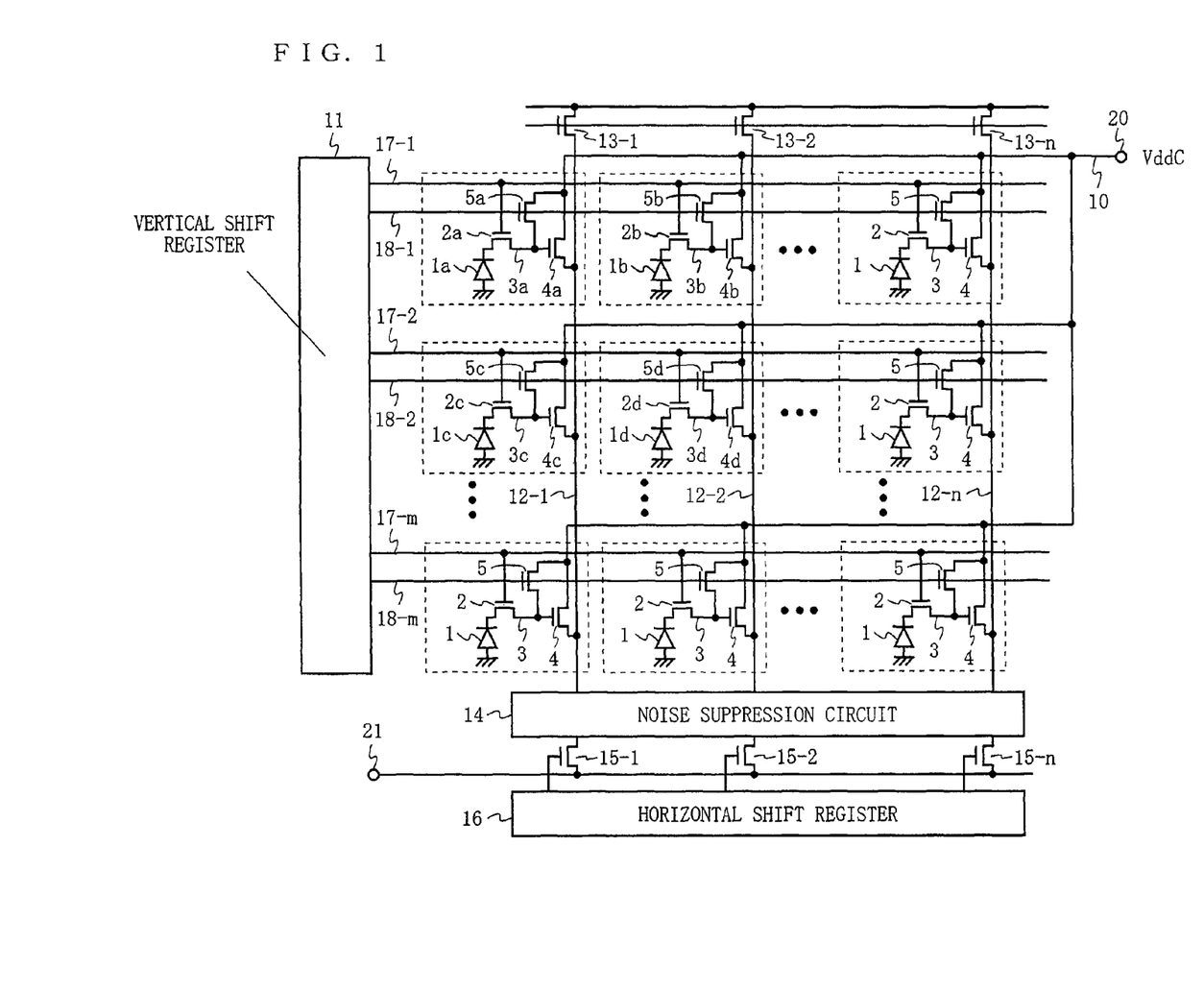
FIG. 1 is a circuit diagram of a sensor according to an embodiment of the present invention.

FIG. 1 is a circuit diagram of a sensor according to an embodiment of the present invention. The sensor shown in FIG. 1 has photosensitive cells (the portions surrounded by dotted-lines) arranged in an m×n matrix form; a power supply line 10; a vertical shift register 11; n vertical signal lines 12-1 to 12-$n$; n load transistors 13-1 to 13-$n$; a noise suppression circuit 14; n horizontal transistors; and a horizontal shift register 16. Each photosensitive cell includes a photodiode 1, a transfer gate 2, a floating diffusion layer portion 3, an amplifying transistor 4, and a reset transistor 5. The photosensitive cell is characterized in that it includes three transistors (the transfer gate 2, the amplifying transistor 4, and the reset transistor 5) and does not include an address transistor. The values of m and n in an actual sensor are in the order of from several tens to several thousands.

The m×n photosensitive cells are formed on a semiconductor substrate. More specifically, the photosensitive cells are formed on a p-type substrate or in a p-well on an n-type substrate. In each photosensitive cell, the photodiode 1 converts incoming light into electricity and accumulates therein an obtained signal charge. The transfer gate 2 is provided between the photodiode 1 and the floating diffusion layer portion 3, and transfers the signal charge accumulated in the photodiode 1 to the floating diffusion layer portion 3. The floating diffusion layer portion 3 temporarily accumulates therein the signal charge transferred from the photodiode 1. The amplifying transistor 4 amplifies the signal charge accumulated in the floating diffusion layer portion 3. The reset transistor 5 resets the signal charge accumulated in the floating diffusion layer portion 3.

In a photosensitive region where the photosensitive cells are arranged, pairs of m signals lines 17-1 to 17-$m$ and 18-1 to 18-$m$ are wired in addition to the power supply line 10 and the vertical signal lines 12-1 to 12-$n$. The power supply line 10 is commonly connected to drains of the amplifying transistors 4. The present embodiment assumes that the power supply line 10 is commonly connected to the drains of the amplifying transistors 4 and the reset transistors 5 included in all the photosensitive cells, and a pulsed power supply voltage VddC is applied to all the photosensitive cells from a power supply terminal 20 which is present at the other end of the power supply line 10. Note that although, in FIG. 1, all the photosensitive cells are connected to the single power supply line 10, two or more power supply lines may be used to supply a common power supply to the photosensitive cells.

Each of the vertical signal lines 12-1 to 12-$n$ is provided to a corresponding column of photosensitive cells. The vertical signal lines 12-1 to 12-$n$ connect between corresponding amplifying transistors 4 included in photosensitive cells and corresponding load transistors 13-1 to 13-$n$, which are arranged in the same column, and the noise suppression circuit 14. The signal lines 17-1 to 17-$m$ and 18-1 to 18-$m$ are output signal lines of the vertical shift register 11, and are each provided to a corresponding row of photosensitive cells. The signal lines 17-1 to 17-$m$ connect between gates of corresponding transfer gates 2 included in photosensitive cells arranged in the same row. The signal lines 18-1 to 18-$m$ connect between gates of corresponding reset transistors 5 included in photosensitive cells arranged in the same row.

The vertical shift register 11 operates as a vertical driver circuit as described below. When the power supply line VddC is at a high level, the vertical shift register 11 simultaneously drives corresponding transfer gates 2 included in photosensitive cells arranged in the same row. In addition, when the power supply line VddC is at a high level, the vertical shift register 11 simultaneously drives corresponding reset transistors 5 included in photosensitive cells arranged in the same row, at a different timing than the drive timing of the transfer gates 2. The load transistors 13-1 to 13-$n$ are connected to the vertical signal lines 12-1 to 12-$n$, respectively, and arranged in the row direction. The noise suppression circuit 14 is connected to the vertical signal lines 12-1 to 12-$n$, and captures signals outputted from the amplifying transistors 4 and then removes the noise component in the captured signals. Horizontal transistors 15-1 to 15-$n$ are arranged in the row direction. To the horizontal transistors 15-1 to 15-$n$ are inputted n signals outputted from the noise suppression circuit 14, respectively. The horizontal shift register 16 operates as a horizontal driver circuit. Specifically, the horizontal shift register 16 allows the horizontal transistors 15-1 to 15-$n$ to sequentially and selectively operate. By doing so, the n signals outputted from the noise suppression circuit 14 are sequentially outputted from the output terminal 21.

Figure 2A:
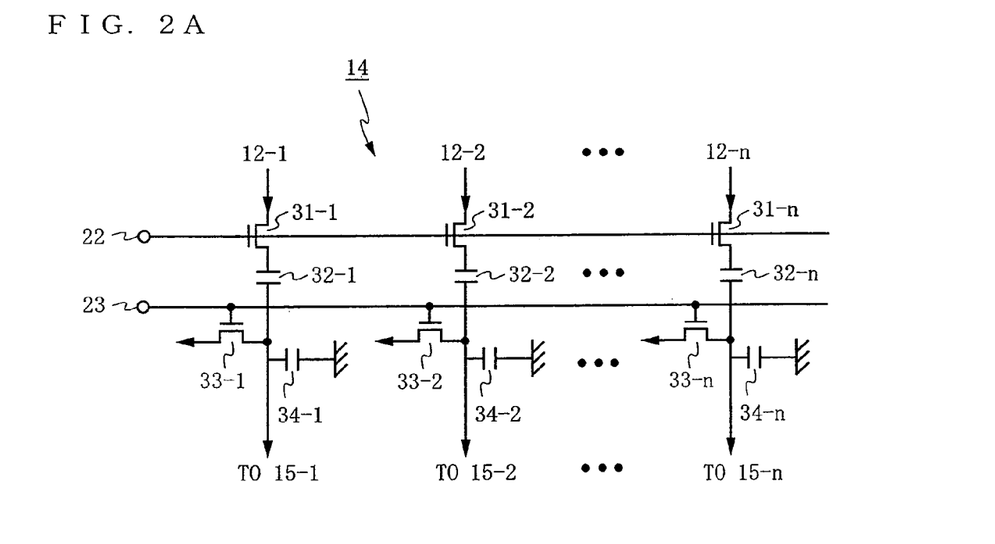
FIGS. 2A and 2B are diagrams showing the details of a noise suppression circuit of the sensor according to the embodiment of the present invention.
Figure 2B:
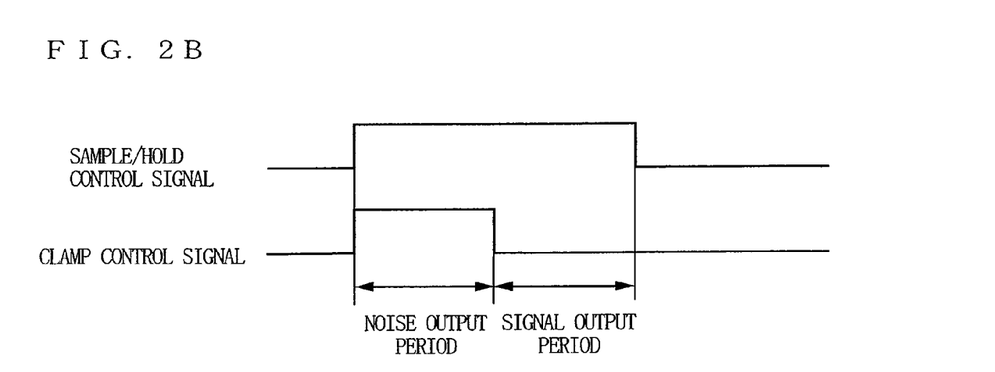

FIGS. 2A and 2B are diagrams for describing the details of the noise suppression circuit 14. The noise suppression circuit 14 includes, as shown in FIG. 2A, n sample/hold transistors 31-1 to 31-$n$; n clamp capacitors 32-1 to 32-$n$; n clamp transistors 33-1 to 33-$n$; and n sample/hold capacitors 34-1 to 34-$n$. The noise suppression circuit 14 is different from the noise suppression circuit shown in FIG. 5 in the position of the sample/hold transistors 31-1 to 31-$n$, but operates substantially in the same manner as the noise suppression circuit shown in FIG. 5. A sample/hold control signal inputted from a control terminal 22 is applied to gates of the sample/hold transistors 31-1 to 31-$n$. Similarly, a clamp control signal inputted from a control terminal 23 is applied to gates of the clamp transistors 33-1 to 33-$n$. These two control signals change as shown in FIG. 2B. A period during which both of the two control signals are at a high level serves as a noise output period, and a period during which the sample/hold control signal is at a high level and the clamp control signal is at a low level serves as a signal output period.

With reference to a timing chart shown in FIG. 3, where appropriate, a method of driving the sensor shown in FIG. 1 will be described below. To drive the sensor, there are performed a step of pulse-driving the power supply line 10 on a per horizontal period basis; a step of reading signals for one row from the m×n photodiodes 1 using the vertical shift register 11; and a step of sequentially outputting the read signals for one row using the horizontal shift register 16.

Figure 3:
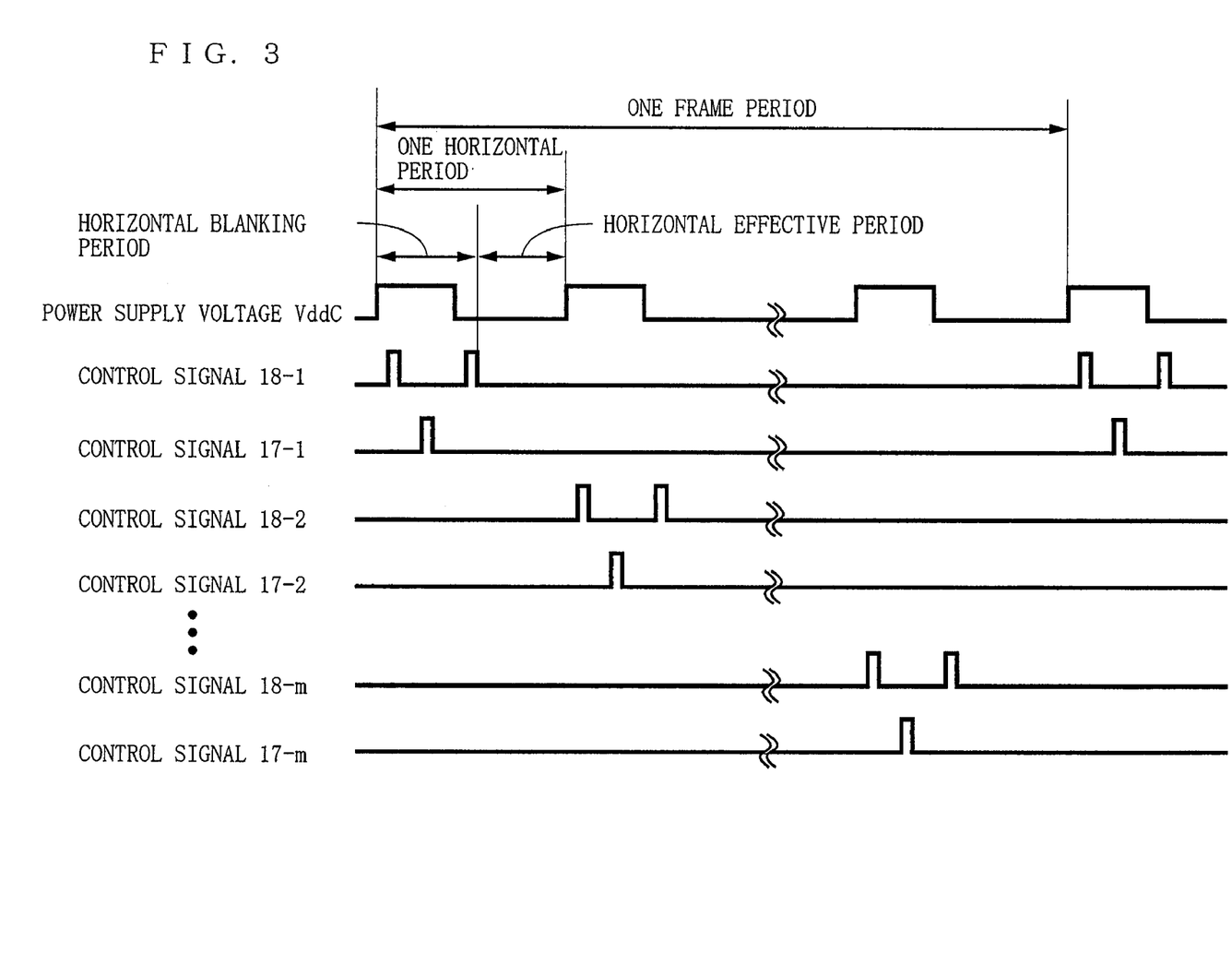
FIG. 3 is a timing chart showing a method of driving the sensor according to the embodiment of the present invention.

As shown in FIG. 3, in an initial state, a power supply voltage VddC is at a low level. That is, in the initial state, the power supply line 10 is not yet driven. To extract signals from the photosensitive cells in the first row, first, the power supply voltage VddC is controlled to be at a high level. By this, in all the photosensitive cells, the drains of the transfer gates 2 and the reset transistors 5 are brought to a high level. Then, while the power supply line 10 is driven, the vertical shift register 11 brings the signal line 18-1 to a high level for a predetermined period of time. By this, the gate potentials of the reset transistors 5a and 5b and all other reset transistors 5 included in the photosensitive cells in the first row are brought to a high level, and these reset transistors 5 are brought into an ON state. At this stage, the amplifying transistors 4a and 4b and all other amplifying transistors 4 included in the photosensitive cells in the first row are brought into an operation state. At the same time, noise outputs, which are generated when signal charges accumulated in the floating diffusion layer portions 3a and 3b and all other floating diffusion layer portions 3 included in the photosensitive cells in the first row are reset, appear on the vertical signal lines 12-1 to 12-n.

Subsequently, while the power supply line 10 is driven, the vertical shift register 11 brings the signal line 17-1 to a high level for a predetermined period of time. By this, the gate potentials of the transfer gates 2a and 2b and all other transfer gates 2 included in the photosensitive cells in the first row are brought to a high level, and these transfer gates 2 are brought into an ON state. At this stage, signal charges accumulated in the photodiodes 1a and 1b and all other photodiodes 1 included in the photosensitive cells in the first row are read into corresponding floating diffusion layer portions 3 included in the photosensitive cells, and then signal outputs corresponding to the read signal charges appear on the vertical signal lines 12-1 to 12-n.

In this manner, on each of the vertical signal lines 12-1 to 12-n, after a noise voltage appears, the sum of a signal voltage and the noise voltage appears. The noise suppression circuit 14 operates in the same manner as the conventional noise suppression circuit, and suppresses the noise of the signals outputted to the vertical signal lines 12-1 to 12-n. The n signals outputted from the noise suppression circuit 14 are inputted to the horizontal transistors 15-1 to 15-n, respectively.

After the noise suppression circuit 14 goes into operation, the power supply voltage VddC changes to a low level. Then, while the power supply line 10 is not driven, the vertical shift register 11 brings the signal line 18-1 to a high level for a predetermined period of time. By this, signal charges accumulated in the floating diffusion layer portions 3a and 3b and all other floating diffusion layer portions 3 included in the photosensitive cells in the first row are reset. The amplifying transistors 4a and 4b and all other amplifying transistors 4 included in the photosensitive cells in the first row remain in a non-operation state until they are selected again.

The horizontal shift register 16 outputs n output signals connected to the gates of the horizontal transistors 15-1 to 15-n. The horizontal shift register 16 selectively brings the n output signals to a high level, and thereby sequentially and selectively controls the horizontal transistors 15-1 to 15-n to be in an ON state. By this, signals corresponding to the signal charges accumulated in the photodiodes 1a and 1b and all other photodiodes 1 in the first row are sequentially outputted from the output terminal 21.

Then, to extract signals from the photosensitive cells in the second row, the same operations as for the first row are performed on the photosensitive cells in the second row. By this, signals corresponding to signal charges accumulated in the photodiodes 1c and 1d and all other photosensitive cells in the second row are sequentially outputted from the output terminal 21. Thereafter, the same operations are performed on photosensitive cells from the third to the m-th rows. Note that the definitions of a horizontal blanking period, a horizontal effective period, one horizontal period, and one frame period shown in FIG. 3 and the fact that the photodiodes 1 have uniform sensitivity, are the same as those for the conventional sensor.

Of methods of driving a sensor, such as that described above, the present embodiment considers a driving method which is characterized in that the low-level potential of a power supply voltage VddC is a predetermined potential higher than zero potential. Specifically, there are considered a driving method in which the low-level potential of the power supply voltage VddC is higher than the channel potentials obtained when a low level is applied to reset transistors 5, and a driving method in which the low-level potential of the power supply voltage VddC is higher than the channel potentials obtained when a low level is applied to transfer gates 2. According to the driving methods having such characteristics, a reproduced image having less noise than that obtained by conventional driving methods can be obtained. The reasons will be described below with reference to FIGS. 4A and 4B.

Figure 4A:
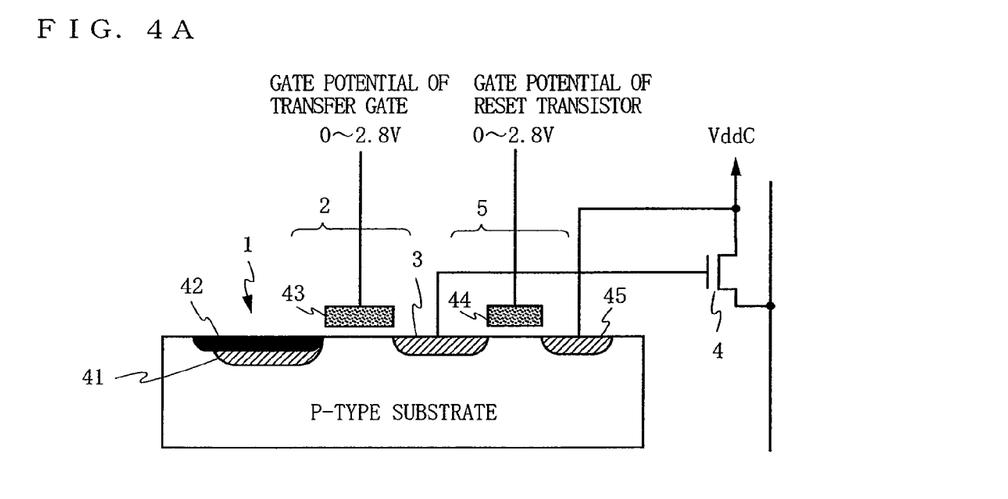
FIGS. 4A and 4B are a cross-sectional view and a potential diagram of a photosensitive cell of the sensor according to the embodiment of the present invention.
Figure 4B:
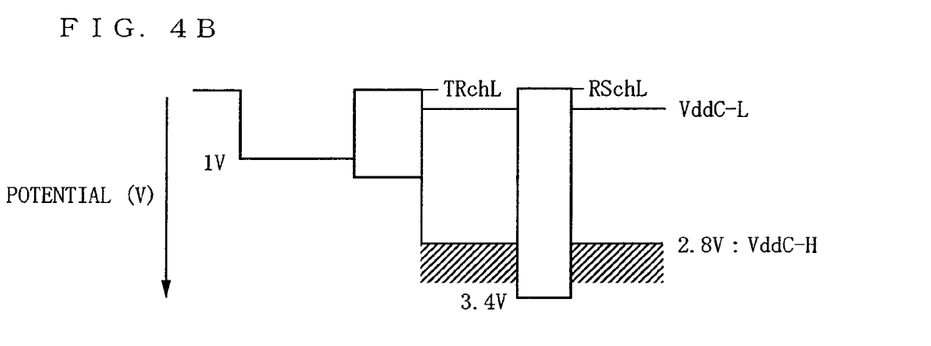

FIGS. 4A and 4B are respectively a cross-sectional view and a potential diagram of a photosensitive cell included in the sensor shown in FIG. 1. In FIG. 4A, the photosensitive cell is formed on a p-type substrate. The p-type substrate, an n-type photodiode layer 41 formed on the p-type substrate, and a p-type surface layer 42 formed on a surface of the p-type substrate, compose a photodiode 1. In addition to the photodiode 1, a floating diffusion layer portion 3 and an n-type surface layer 45 are formed on the p-type substrate. Upon this, by providing an electrode 43 a transfer gate 2 is formed, and by providing an electrode 44 a reset transistor 5 is formed.

As described above, the power supply voltage VddC changes in pulse form. Here, the high-level potential and low-level potential of the power supply voltage VddC are noted as VddC_H and VddC_L, respectively (see FIG. 4B). The actual value of VddC_H is 2.8 V, for example. A voltage which varies within a range from 0 V to 2.8 V is applied to the gates of the reset transistors 5; the channel potentials obtained when a low-level potential (0 V) is applied to the gates of the reset transistors 5 are noted as TRchL. A voltage which varies in a range from 0 V to 2.8 V is also applied to the gates of the transfer gates 2; the channel potentials obtained when a low-level potential (0 V) is applied to the gates of the transfer gates 2 are noted as RSchL. With the use of the notation, in the present embodiment, the low-level potential VddC_L of the power supply voltage is controlled such that the following relationship(s) holds:

$$RSchL < VddC\_L \quad (1)$$

and/or $$TRchL < VddC\_L \quad (2).$$

The use of a low-level potential VddC_L for which the aforementioned expression (1) holds, prevents the amplifying transistors 4 from operating in the vicinity of their respective gate regions. Thus, a phenomenon does not occur in which a large number of amplifying transistors 4 simultaneously go into operation and as a result the entire sensor is driven. Accordingly, it is possible to solve a problem that a great noise is superimposed during a horizontal blanking period, and thereby signal processing becomes difficult.

The use of a low-level potential VddC_L for which the aforementioned expression (2) holds, prevents a phenomenon from occurring in which because of the charges injected into the photodiodes 1 variations in the amount of charge to be injected occur in the photosensitive cells. Accordingly, it is possible to read a beautifully reproduced image without causing a great noise to appear in the reproduced image.

As described above, by using a low-level potential VddC_L of the power supply voltage for which the aforementioned expression(s) (1) and/or (2) holds, the entire sensor is not driven and the potential of each pixel is stabilized, and therefore it is possible to read a beautifully reproduced image with low noise.

Note that, in practice, in place of the aforementioned expressions (1) and (2), or in addition to the aforementioned expression(s) (1) and/or (2), as the low-level potential VddC_L of the power supply voltage, a potential higher than the channel potentials of photodiodes may be used. In the case of using such a potential, a reproduced image with low noise can be read from the sensor shown in FIG. 1 as well.

For a sensor to which the driving method according to the present embodiment is applicable, a sensor formed on a p-type substrate, as shown in FIG. 4A, may be used or a sensor formed on a p-well in an n-type substrate may be used. The driving method according to the present embodiment is applicable to a sensor formed by either method.

INDUSTRIAL APPLICABILITY

As described above, the method of driving a solid-state imaging device according to the present invention has characteristics in that a reproduced image with low noise can be read, and thus can be used as a driving method by which a reproduced image is read from various solid-state imaging devices.

The invention claimed is:

1. A solid-state imaging device, comprising:
a photosensitive region having a plurality of photosensitive cells which are two-dimensionally arranged in first and second directions, each photosensitive cell including a photoelectrical conversion element for generating a signal charge corresponding to an intensity of incident light, a transfer transistor for reading the signal charge in the photoelectrical conversion element and transferring the read signal charge to a signal charge detection section, an amplifier transistor for outputting an electrical signal corresponding to changes in potential of the signal charge detection section, and a reset transistor for resetting the potential of the floating diffusion layer section to a predetermined initial value; and
a line for supplying a selected voltage to the drain of the reset transistor of each photosensitive cell,
wherein:
a plurality of transfer control lines for controlling gates of the transfer transistors and a plurality of reset control lines for controlling gates of the reset transistors are provided so as to extend in the first direction,
a plurality of output signal lines are connected to sources of the amplifier transistors in the second direction,
the line supplies, as the selected voltage, a first voltage and a second voltage which is lower than the first voltage,
a potential of the second voltage is higher than zero potential, and
a potential of a channel, which is formed beneath a gate of the reset transistor of a given one of the photosensitive cells when a low level voltage is applied to the gate of the reset transistor of said given one of the photosensitive cells, is lower than the second voltage.

2. The solid-state imaging device according to claim 1, wherein:
the selected voltage is fixed at the first voltage for a predetermined time period;
a high level pulse is applied to the reset transistor of said given one of the photosensitive cells to reset the signal charge detection section of said given one of the photosensitive cells;
a high level pulse is applied to the transfer transistor of said given one of the photosensitive cell to transfer the signal charge in the photoelectrical conversion element to the signal charge detection section of said given one of the photosensitive cells; and
the selected voltage is returned to the second voltage to read out the signal charge in the photoelectrical conversion element of said given one of the photosensitive cells.

3. The solid-state imaging device according to claim 1, wherein:
a high level pulse is applied to the reset transistor of a given one of the photosensitive cells to reset the electrical charge detection section of said given one of the photosensitive cells within a time period during which the line is at the second voltage; and thereafter
the voltage of the line is returned to the first voltage to reset the signal charge in the photoelectrical conversion section of said given one of the photosensitive cells.

4. The solid-state imaging device according to claim 1, further comprising:
a plurality of vertical signal lines, each of which is connected to at least one amplifier transistor;
a noise suppression circuit for suppressing noise in signals outputted to the vertical signal lines; and
a horizontal shift register which receives an output of the noise suppression circuit as an input, wherein:
the noise suppression circuit operates within a time period during which the first voltage is applied and during which the horizontal shift register is not driven.

5. A solid-state imaging device, comprising:
a photosensitive region having a plurality of photosensitive cells which are two-dimensionally arranged in first and second directions, each photosensitive cell including a photoelectrical conversion element for generating a signal charge corresponding to an intensity of incident light, a transfer transistor for reading the signal charge in the photoelectrical conversion element and transferring the read signal charge to a signal charge detection section, an amplifier transistor for outputting an electrical signal corresponding to changes in potential of the signal charge detection section, and a reset transistor for resetting the potential of the floating diffusion layer section to a predetermined initial value; and
a line for supplying a selected voltage to the drain of the reset transistor of each photosensitive cell,
wherein
the line supplies, as the selected voltage, a first voltage and a second voltage which is lower than the first voltage,
a potential of the second voltage is higher than zero potential,
the drain of the reset transistor of a given one of the photosensitive cells and the drain of the amplifier transistor of said given photosensitive cell are connected with each other, and
a potential of a channel, which is formed beneath a gate of the reset transistor of said given one of the photosensitive cells when a low level voltage is applied to the gate of the reset transistor, is lower than the second voltage.

6. The solid-state imaging device according to claim 5, wherein:
drains of reset transistors in photosensitive cells which are adjacent in a horizontal scanning direction are connected with each other.

7. The solid-state imaging device according to claim 5, further comprising:

a plurality of vertical signal lines, each of which is connected to at least one amplifier transistor;

a noise suppression circuit for suppressing noise in signals outputted to the vertical signal lines; and a horizontal shift register which receives an output of the noise suppression circuit as an input, wherein the noise suppression circuit operates within a time period during which the first voltage is applied and during which the horizontal shift register is not driven.

8. A method for driving a solid-state imaging device, said solid state imaging device including a photosensitive region having a plurality of photosensitive cells which are two-dimensionally arranged in first and second directions, each photosensitive cell including a photoelectrical conversion element for generating a signal charge corresponding to an intensity of incident light, a transfer transistor for reading the signal charge in the photoelectrical conversion element and transferring the read signal charge to a signal charge detection section, an amplifier transistor for outputting an electrical signal corresponding to changes in potential of the signal charge detection section, and a reset transistor for resetting the potential of the floating diffusion layer section to a predetermined initial value; a line for supplying a selected voltage to the drain of the reset transistor of each photosensitive cell; a plurality of transfer control lines for controlling gates of the transfer transistors and a plurality of reset control lines for controlling gates of the reset transistors are provided so as to extend in the first direction; and a plurality of output signal lines are connected to sources of the amplifier transistors in the second direction, wherein the line supplies, as the selected voltage, a first voltage and a second voltage which is lower than the first voltage, and a potential of the second voltage is higher than zero potential, and a potential of a channel, which is formed beneath a gate of the reset transistor of said given one of the photosensitive cells when a low level voltage is applied to the gate of the reset transistor of said given one of the photosensitive cells, is lower than the second voltage the method comprising:

fixing the line at the first voltage for a predetermined time period;

applying a high level pulse to the reset transistor of said given one of the photosensitive cells to reset the signal charge detection section of said given one of the photosensitive cells;

applying a high level pulse to the transfer transistor of said given one of the photosensitive cells to transfer the signal charges in the photoelectrical conversion element to the signal charge detection section of said given one of the photosensitive cells; and returning the voltage of the line to the second voltage to read out the signal charge in the photoelectrical conversion element of said given one of the photosensitive cells.

9. The method according to claim 8, further comprising:

applying the high level pulse to the reset transistor of said given one of the photosensitive cells to reset the signal charge detection section of said given one of the photosensitive cells within a time period during which the line, is at the second voltage; and thereafter, returning the voltage of the line to the first voltage to reset the signal charge in the photoelectrical conversion element.

10. The method according to claim 9, wherein:

the solid-state imaging device further comprises:

a noise suppression circuit for suppressing noise in signals outputted to the vertical signal lines: and a horizontal shift register which receives an output of the noise suppression circuit as an input, the method further comprising:

operating the noise suppression circuit within a time period during which the first voltage is applied and the horizontal shift register is not driven.

11. The solid-state imaging device according to claim 1, wherein:

a potential of a channel, which is formed beneath a gate of the transfer transistor of a given one of the photosensitive cells when a low level voltage is applied to the gate of the transfer transistor of said given one of the photosensitive cells, is lower than the second voltage.

12. The solid-state imaging device according to claim 5, wherein:

a potential of a channel, which is formed beneath a gate of the transfer transistor of a given one of the photosensitive cells when a low level voltage is applied to the gate of the transfer transistor of said given one of the photosensitive cells, is lower than the second voltage.

13. The method according to claim 8, wherein:

a potential of a channel, which is formed beneath a gate of the transfer transistor of a given one of the photosensitive cells when a low level voltage is applied to the gate of the transfer transistor of said given one of the photosensitive cells, is lower than the second voltage.

* * * * *